United States Patent
Lupke et al.

[19]

[11] Patent Number: 5,846,575
[45] Date of Patent: Dec. 8, 1998

[54] PIPE FORMING MANDREL WITH MULTIPLE SLEEVE INNER TUBE

[76] Inventors: Manfred A. A. Lupke, 92 Elgin Street, Thornhill, Ontario, Canada, L3T 1W6; Stefan A. Lupke, 32 Vintage Lane, Thornhill, Ontario, Canada, L3T 1X6

[21] Appl. No.: 819,508

[22] Filed: Mar. 17, 1997

[51] Int. Cl.$^6$ .................................................. B29C 47/20
[52] U.S. Cl. ................................. 425/192 R; 264/171.27; 425/133.1; 425/380; 425/461; 425/464; 425/467
[58] Field of Search ................................. 425/133.1, 186, 425/190, 192 R, 326.1, 380, 381, 461, 464, 466, 467; 264/173.11, 209.1, 211.21, 171.27

[56] References Cited

U.S. PATENT DOCUMENTS

| | | | |
|---|---|---|---|
| 3,184,792 | 5/1965 | Commisso | 425/466 |
| 3,994,646 | 11/1976 | Hauck | 425/326.1 |
| 4,770,618 | 9/1988 | Lupke | 425/326.1 |
| 4,808,098 | 2/1989 | Chan et al. | 425/326.1 |
| 4,936,768 | 6/1990 | Lupke | 425/326.1 |
| 5,123,827 | 6/1992 | Lupke | 425/133.1 |
| 5,346,384 | 9/1994 | Hegler et al. | 425/381 |
| 5,542,834 | 8/1996 | Lupke | 425/133.1 |
| 5,576,032 | 11/1996 | Lupke | 425/381 |

*Primary Examiner*—Patrick Ryan
*Assistant Examiner*—Joseph Leyson

[57] ABSTRACT

An extruder and mandrel assembly is used in a plastic pipe forming apparatus. The mandrel itself is formed from a pair of elongated tubes comprising an inner tube and an outer tube separated from the inner tube by a plastic flow path through the mandrel. The inner tube is formed by a pair of sleeves comprising an inner sleeve and an outer sleeve which is held within the mandrel by the inner sleeve. The inner sleeve is secured at its upstream end to the spider of the extruder head and the outer sleeve is secured by a releasable interlock to the inner sleeve with the releasable interlock being accessible from the downstream end of the mandrel. Therefore, the mandrel does not have to be released from the spider of the extruder head in order to remove the outer sleeve of the inner tube of the mandrel.

3 Claims, 3 Drawing Sheets

PIPE FORMING MANDREL WITH MULTIPLE SLEEVE INNER TUBE

FIELD OF THE INVENTION

The present invention relates to a mandrel assembly for use in a pipe forming apparatus.

BACKGROUND OF THE INVENTION

A known assembly for a pipe forming apparatus comprises an extruder which feeds molten plastic through an elongated mandrel to a pipe mold. The mandrel is formed by an inner tube and an outer tube around the inner tube. A plastic flow path is defined along the length of the mandrel between the inner tube and the outer tube.

It is important that the inner tube be releasable from the assembly for cleaning of the mandrel or for gaining access to the die tooling at the upstream end of the interior of the mandrel. In some cases, it is critical that the inner tube be releasable in an expedited fashion particularly when there is a concern of gas produced pressure build up within the mandrel. If this pressure build up is not released in time it can have deadly effects.

According to conventional construction, the only way to release the inner mandrel tube is by gaining access to its upstream end which requires a substantial dismantling of the mandrel from the spider of the extruder head. This is extremely time consuming and costly because the pipe forming apparatus needs to be shut down for a substantial length of time and for reasons given above, if the job can not be completely quickly there can be disastrous results.

SUMMARY OF THE INVENTION

The present invention is directed to a mandrel assembly for use in a plastic pipe forming apparatus in which the mandrel includes an inner and an outer tube with the inner tube being easily releasable from the assembly in substantially less time and at substantially lower cost than what has been required in the past.

More particularly the mandrel assembly is one in which the inner tube comprises multiple sleeves including an inner holding sleeve and an outer sleeve around the inner sleeve. The holding sleeve is secured at its upstream end to the spider of the extruder head and the outer sleeve is held on the holding sleeve by releasable securing means which is accessible from the downstream end of the mandrel.

With the above set up, the outer sleeve of the inner tube can be removed from the mandrel without having to release the mandrel at its upstream end from the spider of the extruder head. This allows access to the interior of the mandrel for cleaning, repairs, etc.

According to an aspect of the invention, the holding sleeve is secured to the spider of the extruder by fastening means which is also accessible from the downstream end of the mandrel once the outer sleeve has been removed. This makes the entire inner tube removable from the mandrel without having to release the mandrel from the extruder head.

BRIEF DESCRIPTION OF THE DRAWINGS

The above as well as other advantages and features of the present will be described in greater detail according to the preferred embodiments of the present invention in which.

DETAILED DESCRIPTION ACCORDING TO THE PREFERRED EMBODIMENTS OF THE PRESENT INVENTION

Figure 1:
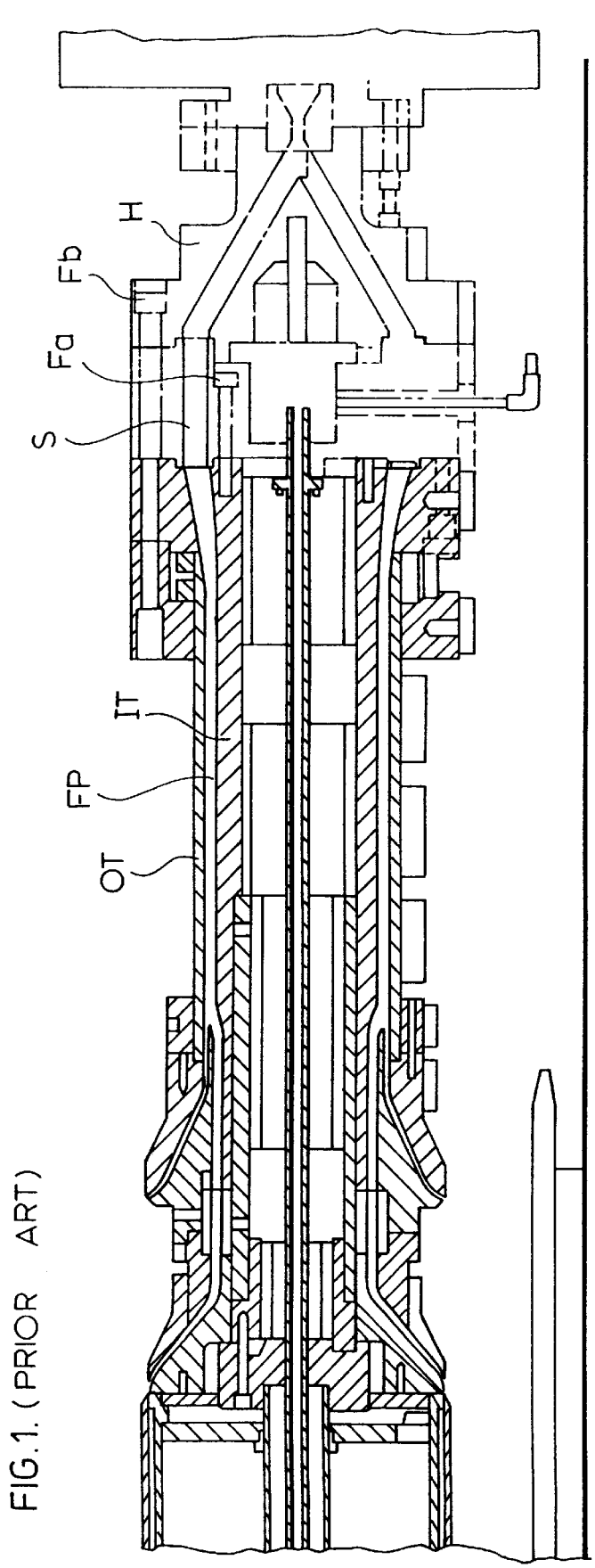
FIG. 1 is a sectional view of a prior art extruder and mandrel assembly.

FIG. 1 shows a prior art extruder and mandrel assembly in which the mandrel comprises an inner tube IT and an outer tube OT separated from one another by a plastic flow path FP. The inner tube as seen has a one piece construction and is secured to the spider S of the head H and an extruder by mechanical fasteners Fa. The heads of these fasteners are only accessible by first releasing the spider with the mandrel attached therewith from the head of the extruder.

FIG. 1 also shows that the outer tube OT is secured to the spider by fasteners Fb which are only accessible from the upstream end of the mandrel. These fasteners are not easily removed without having to first separate the mandrel from the extruder which blocks direct access to the fasteners Fb.

Figure 2:
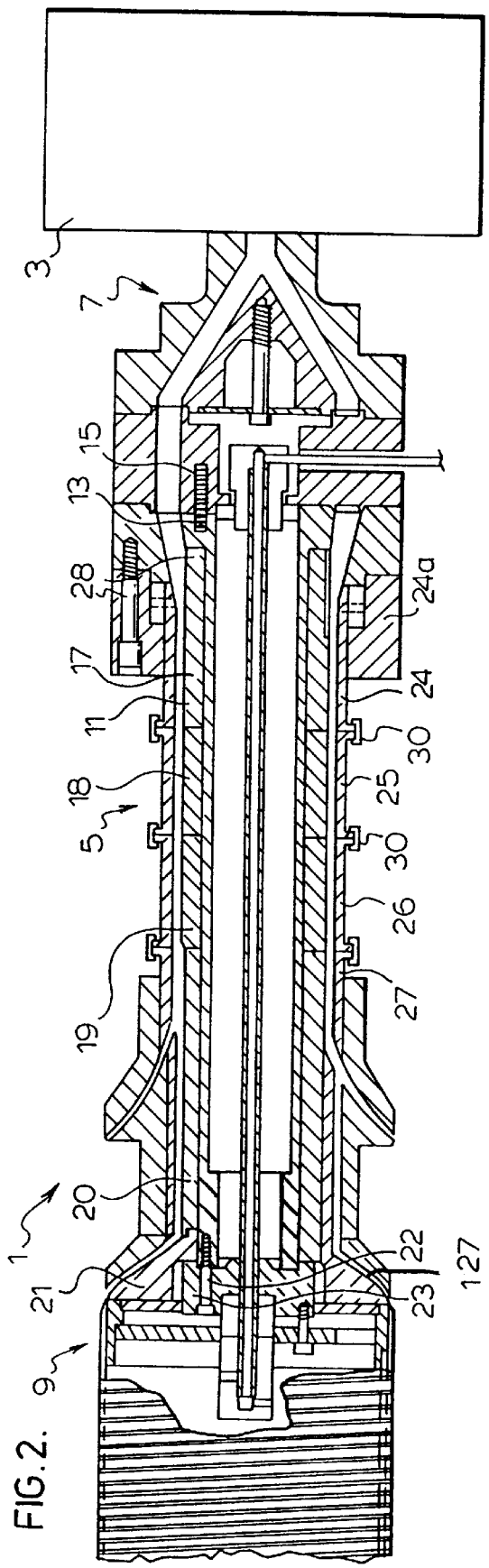
FIG. 2 is a sectional view of an extruder and mandrel assembly according to a preferred embodiment of the present invention.

FIG. 2 shows an extruder and mandrel assembly generally indicated at 1. The extruder 3 is at the upstream end of the combination while the mandrel generally indicated at 5 is downstream of the extruder and leads to a pipe molding region which in this case has a cooling plug 9 at the downstream end of the mandrel. The molten plastic which is used to form the pipe is introduced from the extruder through the mandrel to the pipe forming region.

The mandrel itself includes an inner tube formed from an inner sleeve 11 and an outer sleeve formed by sleeve segments 17, 18, 19 and 20. The inner sleeve 11 provides a holding sleeve for the outer sleeve which terminates at its downstream end with a caliber 21. This caliber has inner and outer caliber portions to opposite sides of a path 127 through the mandrel.

The mandrel also comprises an outer tube formed by tube segments 24, 25, 26 and 27 provided outwardly around the inner tube. The inner and outer tubes are separated from one another by path 127 which is the path along which the molten plastic is fed through the mandrel.

In the arrangement shown the mandrel has two separate exits from the plastic flow path for forming double wall pipe. It could equally as well have only a single exit from the flow path for forming single wall pipe.

The holding sleeve 11 of the inner tube is secured at its upstream end 13 to the spider 7 of the extruder head by a fastening bolt 15 which is hidden by the outer sleeve as shown in FIG. 2.

The key to the present invention is that part or all of the inner tube can be removed from the downstream end of the mandrel without having to disassemble the mandrel from the extruder head.

This is done by first separating the mandrel from the cooling plug 9 which is a simple expedient procedure. This exposes the downstream ends of both the holding and the outer sleeves of the inner tube. A mechanical fastener 22 is fitted directly into the downstream end of the holding sleeve and also through a sleeve block 23. This sleeve block engages the caliber 21. By removing the mechanical fastener 22 and the sleeve block the caliber and then the outer sleeve can be slid in a downstream direction off of the holding sleeve of the inner tube.

Although the drawings show the outer sleeve of the inner tube as being made from a plurality of end to end segments the outer sleeve can also have a unitary construction in which case once the sleeve block 23 and the caliber are removed the outer sleeve slides as one piece off of the holding sleeve.

In the embodiment shown the outer sleeve of the inner tube is as described above made from a plurality of sleeve segments. This has the benefit that if only a certain part of the inner tube needs to be accessed for cleaning or other purposes, then only the required, rather than all of the sleeve segments need to be removed.

Figure 5:
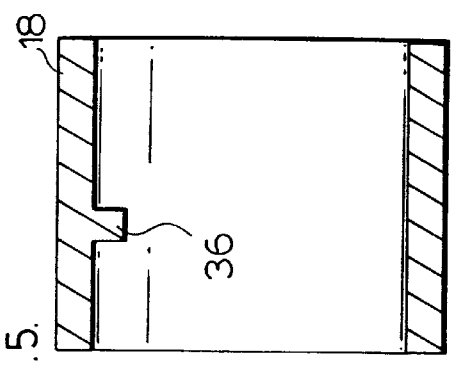
FIG. 5 is a sectional view along the lines 5—5 of FIG. 4.
Figure 4:
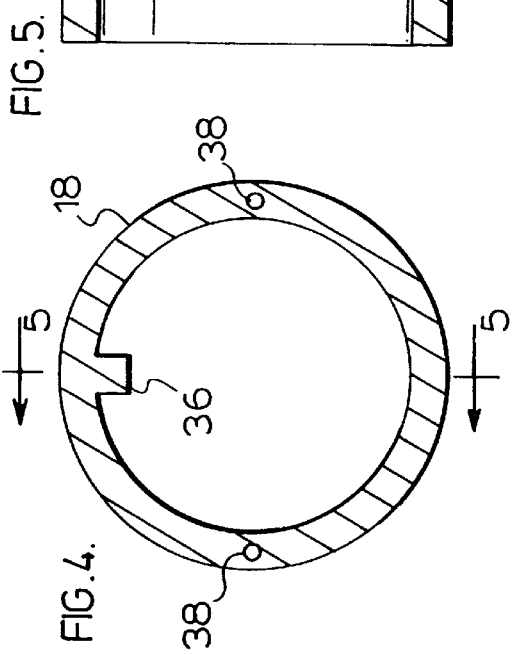
FIG. 4 is an end view of a segment of the outer sleeve of the inner tube from the assembly of FIG. 2.
Figure 3:
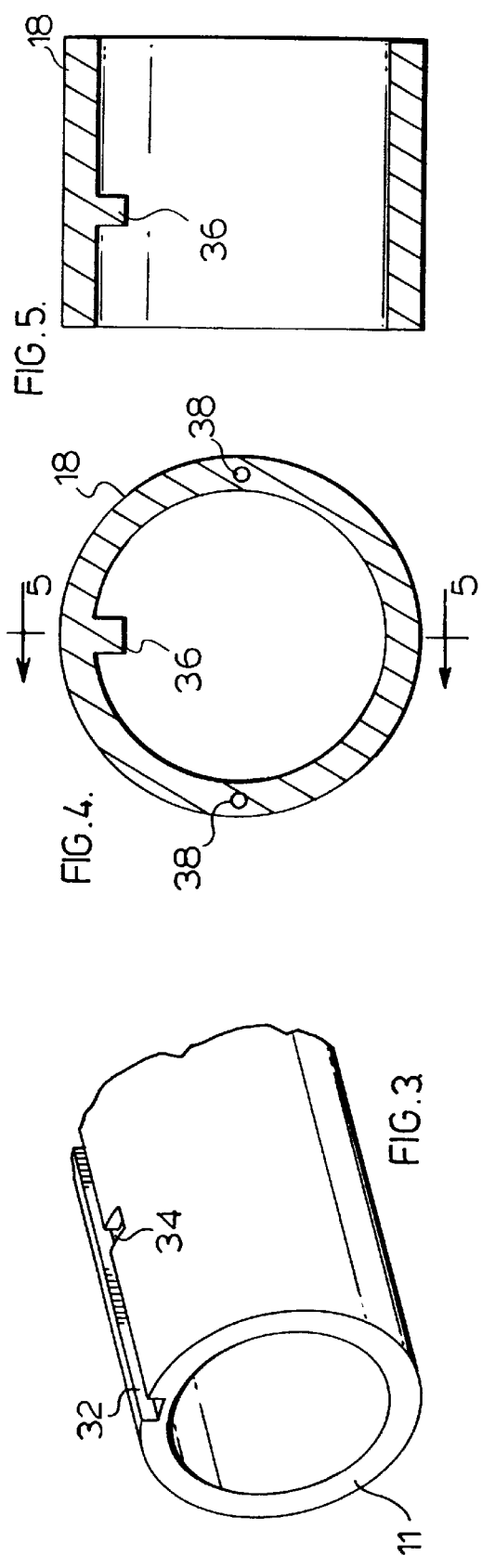
FIG. 3 is a perspective view from one end of the holding sleeve of the inner tube of the assembly of FIG. 2.

FIGS. 4 and 5 show sleeve segment 18 from the outer sleeve of the inner tube. FIG. 3 on the other hand hows the holding sleeve 11. Here it will be seen that an elongated slot 32 is provided on the outside surface of the holding sleeve. This slot runs the entire length of the holding sleeve and is provided at spaced apart junctures with small side slots 34.

Sleeve segment 18 like the other segments in the outer sleeve of the inner tube is provided with an internal tooth 36. This tooth fits into and slides along slot 32 of the holding sleeve until the sleeve segment is in its appropriate position relative to the other sleeve segments of the outer sleeve. In this position tooth 36 lines up with the small slide slot 34 of the holding sleeve. Sleeve segment 18 like the other segments of the outer sleeve is provided with small holes 38 which are accessible to an appropriately shaped tool from the downstream end of the mandrel through the gap between the holding sleeve of the inner tube and the outer tube. The tool is used to turn sleeve segment 18 such that tooth 36 locks into slot 34 to lock the outer sleeve segment directly onto the holding sleeve.

Even though the most upstream outer sleeve segment 17 is locked to the holding sleeve near the upstream end of the mandrel, it is still accessible for releasing from the downstream end of the mandrel. In other words, the mandrel does not have to be separated at its upstream end from the extruder head in order to release any part of the outer sleeve from the holding sleeve.

Once all of the outer sleeve segments have been removed, the fastening bolt 15 of the holding sleeve is exposed and also accessible for releasing from the downstream end of the mandrel. Therefore, the entirety of the inner tube can be unlocked and pulled out of the mandrel without having to release the mandrel from the extruder.

As noted above the outer tube is also formed from a plurality of tube segments. These tube segments are in the embodiment shown held together by releasable clamps 30 exposed to the outside of the mandrel assembly.

By first removing the caliber 21 and then by releasing the clamps 30 the outside tube can also be easily removed segment by segment from the mandrel assembly. The most upstream tube segment 24 has its own foot portion 24a and a mechanical fastener 28 is secured through this foot portion to the spider of the extruder head. This secures the entirety of the outer tube with its clamped segments in a fixed position on the mandrel assembly. Note once again that fastener 28 is accessible for release from the downstream end of the mandrel so that the outer tube can also be removed without having to separate the mandrel from the extruder head.

Figure 6:
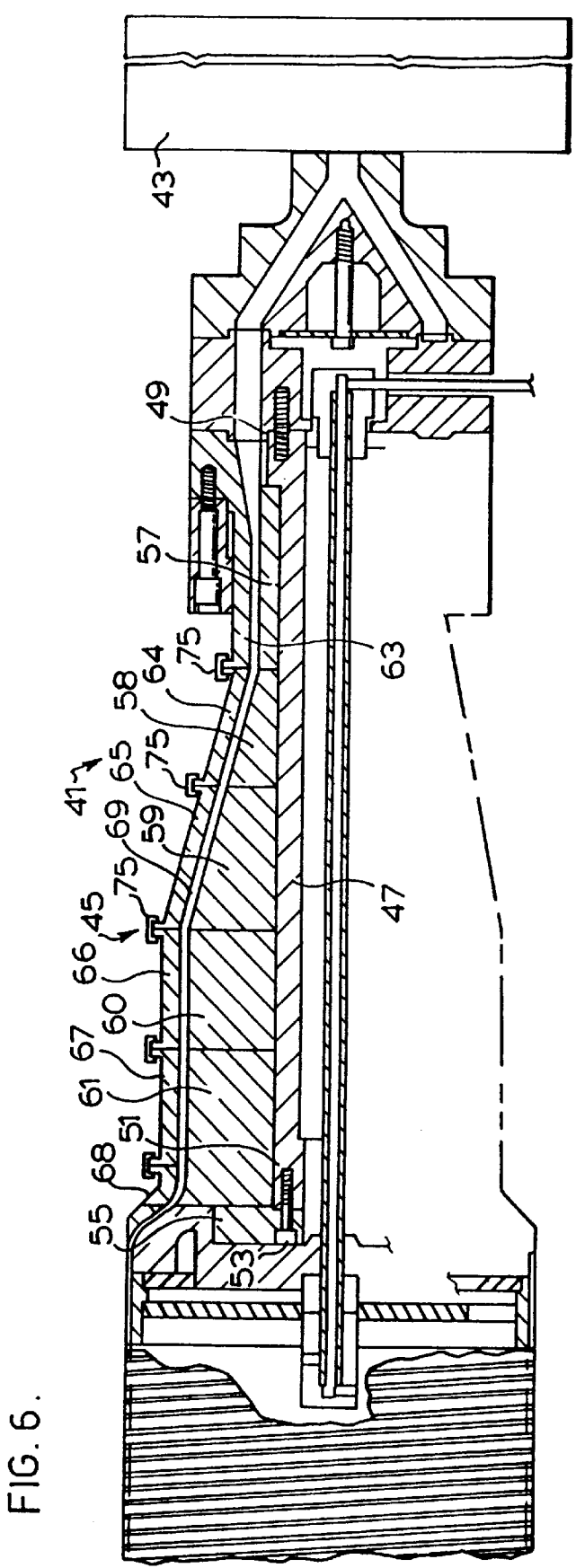
FIG. 6 is a sectional of an extruder and mandrel assembly according to a further preferred embodiment of the present invention.

FIG. 6 shows the assembly set up to form single wall pipe, however, with only minor modifications required to the downstream end of the mandrel further plastic flow paths can be provided to modify the FIG. 6 set up for the formation of double wall or ultra rib pipe.

The mandrel 45 of assembly 41 has an inner tube formed from a central holding sleeve 47 having an upstream end 49 secured to the head of the extruder. Fitted over the holding sleeve is a second sleeve formed from a plurality of sleeve segments 57, 58, 59, 60 and 61. An outer tube is provided over the inner tube and this outer tube is formed by tube segments 63, 64, 65, 66, 67 and 68. The segments in the outer tube are releasably secured to one another by clamps 75.

The most downstream segment 61 of the outer sleeve of the inner tube is prevented from sliding off the holding sleeve by a tube block 55 secured to the downstream end 51 of the holding sleeve by a mechanical fastener 53.

The feature of being able to remove the inner tube at the downstream end of the mandrel 45 is essentially the same as that described in respect of the embodiment shown in FIGS. 2 through 5 of the drawings. However in this case and as will be clearly apparent from FIG. 6, the segments of the inner and outer tubes have been specifically designed to vary and in this case widen the diameter of the plastic flow path around the mandrel. This is done by outwardly tapering both the inner tube segments 58 and 59 and the associated overlying outer tube segments 64 and 65.

No modifications are required at the region where the mandrel hooks up with the extruder to vary the flow path diameter.

The set up shown in FIG. 6 is used to form a relatively large diameter pipe. If a smaller diameter pipe is required then it is possible to replace either some or all of the inner and outer tube segments according to the decrease in the pipe diameter desired.

Although FIG. 6 shows a downstream increasing of the plastic flow path diameter, it is to be appreciated that the mandrel could be set up such that tube segments taper inwardly downstream of the mandrel to reduce the plastic flow path diameter.

In another embodiment the plastic flow path is provided directly through the outer tube segments in which case these tube segments are provided with the required taper without having to provide any taper whatsoever in the inner tube segments.

Although various preferred embodiments of the present invention have been described herein in detail, it will be appreciated by those skilled in the art, that variations may be made without departing from the spirit of the invention or the scope of the appended claims.

The embodiment of the invention in which an exclusive property or privilege is claimed are defined as follows:

1. An extruder and mandrel assembly for use in a plastic pipe forming apparatus, said mandrel comprising elongated inner and outer tubes which define a plastic flow path therebetween for plastic material received from said extruder, said inner tube comprising an inner holding sleeve releasably secured in said assembly by first securing means and an outer sleeve releasably secured on said inner sleeve by second securing means, said inner tube having an upstream end adjacent and a downstream end away from said extruder, said first securing means being provided at said upstream end of said inner tube hidden by said outer sleeve when said outer sleeve is on said inner sleeve, said second securing means being provided and accessible at said downstream end of said inner tube for releasing and removing said outer sleeve from said inner sleeve whereby when the outer sleeve is removed said first securing means becomes accessible for releasing said inner sleeve from said assembly also from said downstream end of said inner tube.

2. The assembly of claim 1 wherein said outer sleeve of said inner tube is made from a plurality of sleeve segments.

3. The assembly of claim 2 wherein each of said sleeve segments is releasably secured to said inner sleeve.

* * * * *